(12) United States Patent
Power et al.

(10) Patent No.: US 8,532,016 B2
(45) Date of Patent: Sep. 10, 2013

(54) METHODS AND APPARATUS FOR OPERATING A WIRELESS COMMUNICATIONS SYSTEM

(75) Inventors: Kevin Power, West Drayton Middlesex (GB); Yanling Lu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 818 days.

(21) Appl. No.: 12/545,588

(22) Filed: Aug. 21, 2009

(65) Prior Publication Data

US 2010/0080164 A1    Apr. 1, 2010

(30) Foreign Application Priority Data

Aug. 22, 2008  (EP) .................................. 08162820

(51) Int. Cl.
H04J 3/14    (2006.01)

(52) U.S. Cl.
USPC .......................................... 370/315; 370/476

(58) Field of Classification Search
None
See application file for complete search history.

(56) References Cited

U.S. PATENT DOCUMENTS

| | | | | |
|---|---|---|---|---|
| 7,873,002 B2* | 1/2011 | Cai | ............................... | 370/329 |
| 7,941,178 B2* | 5/2011 | Guo et al. | ................... | 455/552.1 |
| 2008/0165881 A1 | 7/2008 | Tao et al. | | |

FOREIGN PATENT DOCUMENTS

| | | |
|---|---|---|
| EP | 1879409 | 1/2008 |
| EP | 1890416 | 2/2008 |
| EP | 1890446 | 2/2008 |
| JP | 2009544175 | 12/2009 |

OTHER PUBLICATIONS

Kanchei (Ken) Loa, et al. "IEEE 802.16m Relay Frame Structure". IEEE P802.16j/D9 Draft Amendment to IEEE Standard for Local and Metropolitan Area Networks Part 16: Air Interface for Fixed and Mobile Broadband Wireless Access Systems Multihop Relay Specification.
802.16m-09/0010r1a (working document) Mar. 2008; Part 16: Air Interface for Fixed and Mobile Broadband Wireless Access Systems Advanced Air Interface (working document).
IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Std 802.16e-2005 and IEEE Std 802.16/2004/Cor1-2005.
Japanese Office Action dated Jun. 25, 2013 issued in Japanese Patent Application No. 2009-191807.
Kanchei (Ken) Loa et al., IEEE 802.16m Relay Frame Structure, IEEE C802.16m-08/258 dated Apr. 1, 2008 IEEE 802.16 Broadband Wireless Access Working Group <http://ieee802.org/16>.

* cited by examiner

Primary Examiner — Kevin C Harper
Assistant Examiner — Samina Choudhry
(74) Attorney, Agent, or Firm — Smith, Gambrell & Russell, LLP (57) ABSTRACT

A method of operating a wireless communications system comprising at least a base station, a first relay station, a second relay station and one or more subscriber stations; using at least a first wireless protocol with the first relay station, and using at least a second wireless protocol with the second relay station. Operation of the method comprises using a subframe which comprises: a first-protocol access period; a first-protocol relay period; a second-protocol access period; and a second-protocol relay period. The subframe further comprises an idle period to avoid communications using the first wireless protocol interfering with communications using the second wireless protocol and the overall frame structure is arranged to position the idle period for the first relay station between the first-protocol access period and the first-protocol relay period, to accommodate switching of the first relay station between transmit and receive modes.

16 Claims, 8 Drawing Sheets

METHODS AND APPARATUS FOR OPERATING A WIRELESS COMMUNICATIONS SYSTEM

BACKGROUND

Figure 1:
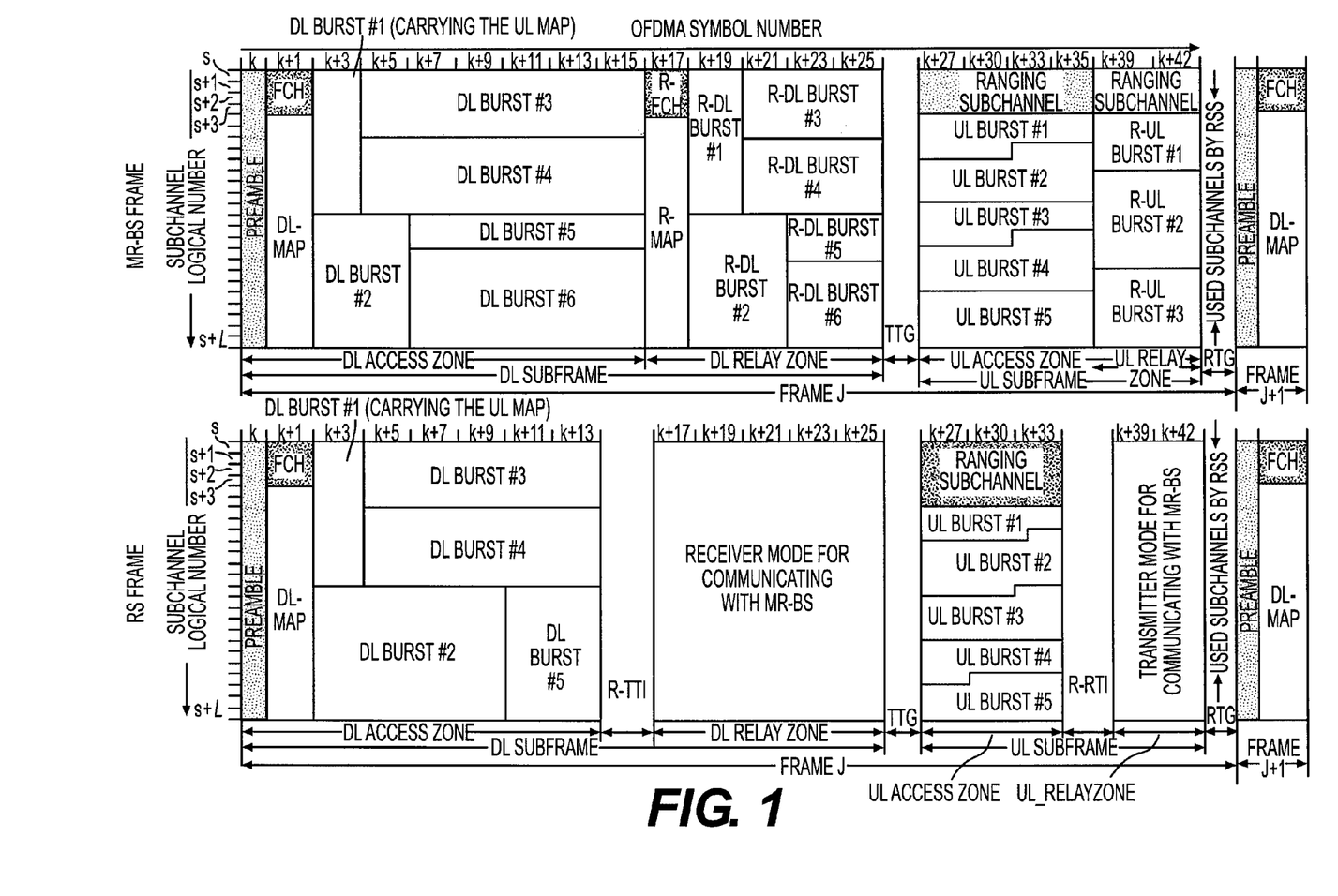
FIG. 1 illustrates a TDD OFDMA frame structure according to the IEEE 802.16j standard.

In current multi-hop OFDMA based wireless communication systems, such as IEEE 802.16j, the TDD frame structure shown in FIG. 1 comprises two subframes, one for downlink and the other for uplink. FIG. 1 demonstrates the single radio non-transparent frame structures with minimum configuration for both the MR-BS (multi-hop relay base station) and RS (relay station) where the downlink and uplink subframes are further partitioned into access and relay zones. The access zone will be used for an MS communicating with either the BS or the RS, whereas the relay zone will be used only for BS to RS or RS to BS communications.

It may be required that all BSs (MR-BSs) within a deployment are upgraded to operate on new standardised protocols such as that defined in IEEE 802.16m. The upgraded deployment may also consist of new RSs also operating on the protocols defined in 802.16m. In this deployment scenario, it is crucial that full legacy support is enabled. Here, "legacy" refers to the pre-existing deployment of 802.16e MSs and 802.16j RSs. Considering a mixed deployment scenario comprising:

Legacy 16e MSs;
Legacy 16j RSs;
New 16m BS (MR-BS);
New 16m RS;

the new 16m BS must be capable of providing full protocol support to each entity.

Figure 2:
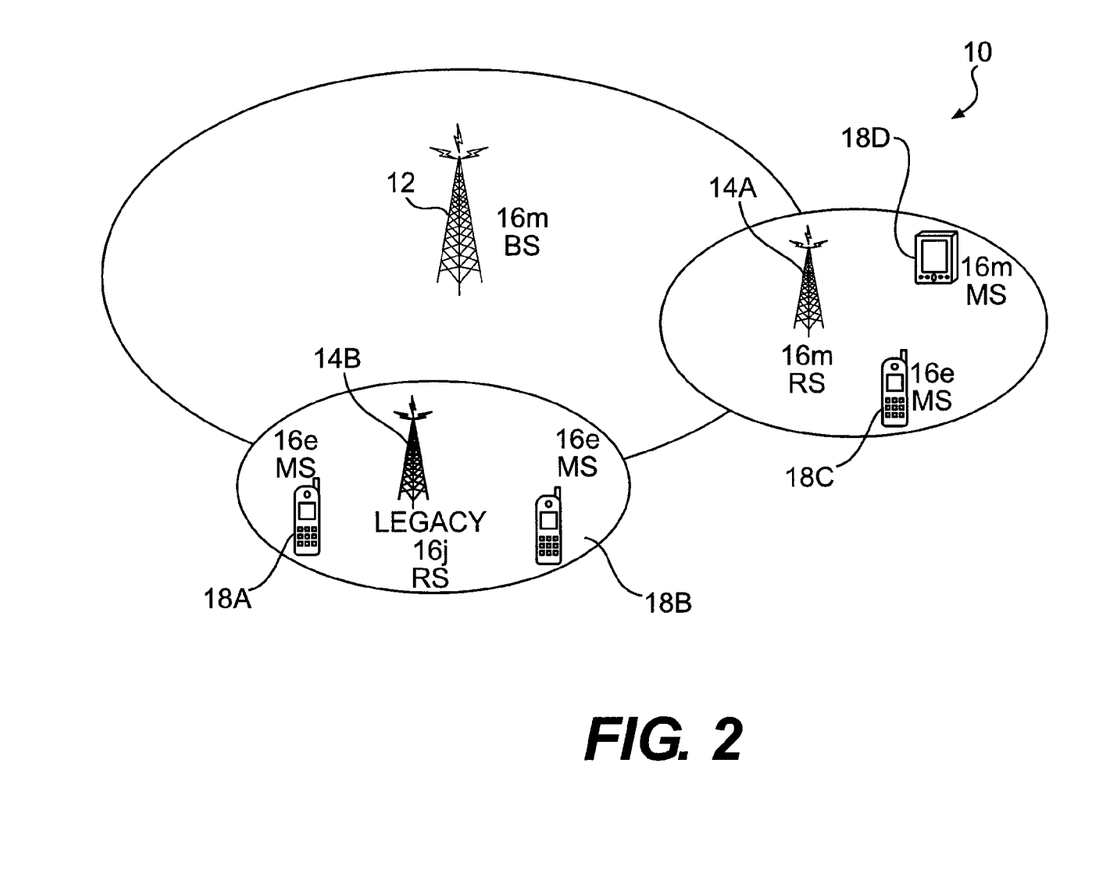
FIG. 2 represents a mixed deployment scenario including legacy 16e MSs, a new 16m MS, a legacy 16j RS, a new 16m RS and a new 16m BS (MR-BS)

FIG. 2 demonstrates this scenario where a 16m BS is serving both 16j and 16m RSs that are located within the same cell.

Figure 3:
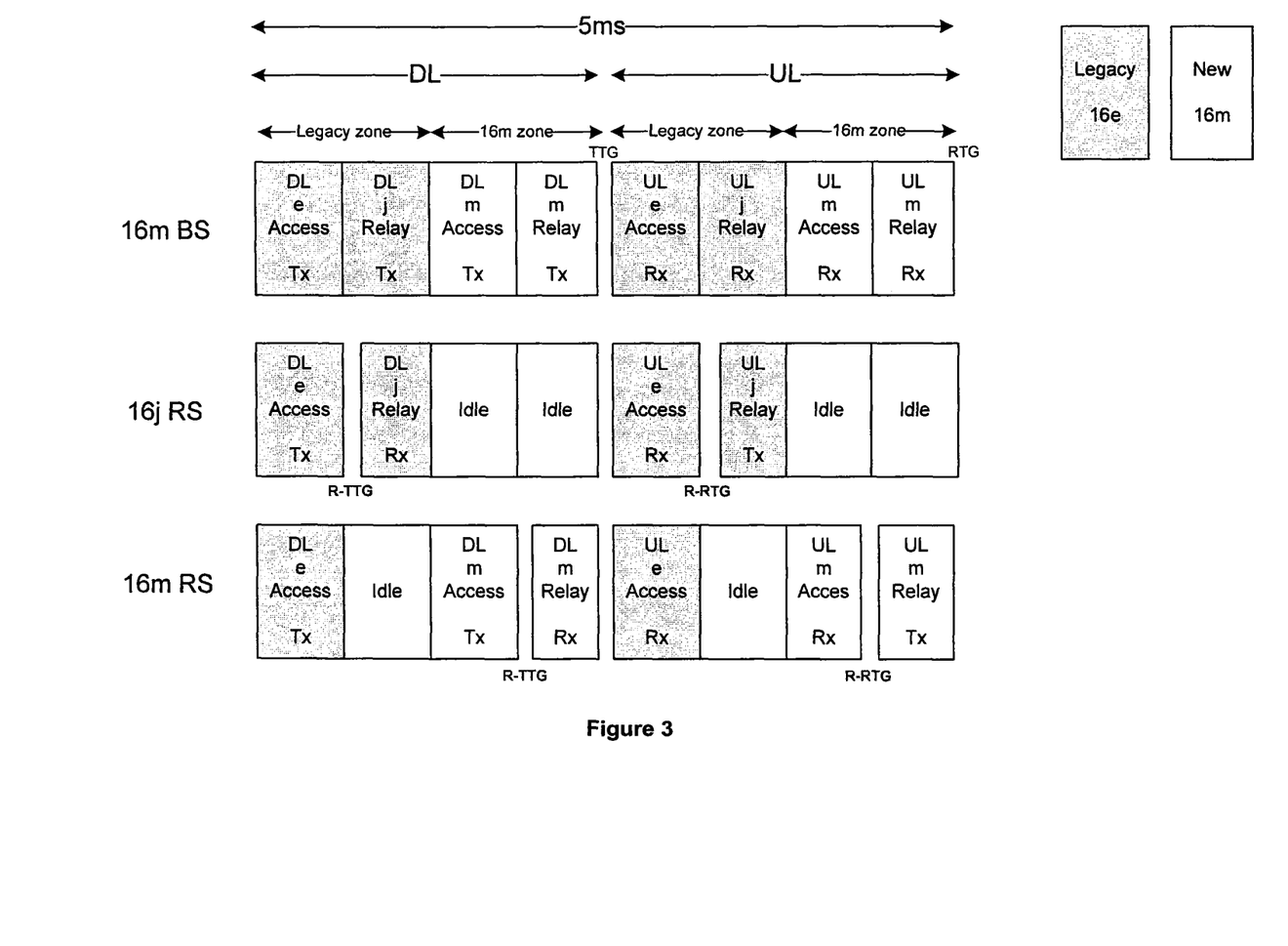
FIG. 3 illustrates a general overall frame structure suitable for the mixed deployment scenario of FIG. 2.

From the 16m BS point of view, the frame structure must be capable of supporting such a configuration without compromising legacy support. A general overall frame structure is shown in FIG. 3, where the 16m BS downlink and uplink subframes have been partitioned into legacy and 16m (new) zones. These zones are then further dissected into access and relay zones.

FIG. 3 also shows the frame structures for the 16j and 16m RSs where idle periods are required to avoid intra- and inter-cell interference. The R-TTG represents the relay transmit-to-receive transition time gap and the R-RTG is referred to as the relay receive-to-transmit transition time gap. The R-TTG allows time for the RS to switch from transmit (Tx) to receive (Rx) mode and, during this gap, the RS is not transmitting modulated data but simply allowing the RS transmitter carrier to ramp down, the Tx/Rx antenna switch to actuate, and the RS receiver section to activate. The R-RTG allows time for the RS to switch from receive (Rx) to transmit (Tx) mode and, during this gap, the RS is not receiving data but allowing the RS transmitter carrier to ramp up, the Rx/Tx antenna switch to actuate and the RS transmitter section to activate.

SUMMARY

According to a first aspect, there is provided a method of operating a wireless communications system comprising at least a base station, a first relay station, a second relay station and one or more subscriber stations;
wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the method comprising operating the system according to an overall frame structure in which a subframe comprises:
a first-protocol access period for access communications using the first wireless protocol, during which the first relay station is in one of a transmit mode and a receive mode;
a first-protocol relay period for relay communications using the first wireless protocol, during which the first relay station is in the other of the transmit mode and the receive mode;
a second-protocol access period for access communications using the second wireless protocol; and
a second-protocol relay period for relay communications using the second wireless protocol;
the subframe further comprising an idle period for the first relay station for substantially the whole of one or both of the second-protocol access period and the second-protocol relay period, to avoid communications using the first wireless protocol interfering with communications using the second wireless protocol; and
wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

The wireless communications system may comprise any collection of nodes or communication apparatuses which are capable of communicating wirelessly with one another, for example by forming a wireless network. For example, the wireless communications system may comprise a WiMAX network, based on the IEEE 802.16 standards. In another example, the wireless communications system may comprise a telecommunications network, for example based on the standards developed by 3GPP or 3GPP2.

The base station may comprise any apparatus which serves directly or indirectly to control access by other stations to network resources, which may include, for example, permitting access to the resources, allocating bandwidth, monitoring connections, and so on.

A relay station may comprise any apparatus which is configured to forward data or control information received from a subscriber station to the base station or vice versa. The relay station may form part of a communication path between the base station and a subscriber station. The first and second relay stations may form part of different communication paths, owing to the different protocols used. For example, the first relay station may form part of a first communication path between the base station and a subscriber station, and the second relay station may form part of a second communication path between the base station and a subscriber station. In one example, the first relay station is a 16m relay station and the second relay station is a 16j relay station.

The subscriber station (SS) may comprise any apparatus which is used by a user to access network resources. The subscriber station may or may not be portable, and may be intended for location indoors or outdoors. Examples of subscriber stations may include handsets, mobile telephones, smartphones, PC peripherals or components, consumer electronics devices, game terminals and mp3 players. The subscriber station may comprise a mobile station (MS) or user equipment, for example. It is to be understood that the terms SS and MS are used interchangeably, and that the term MS when used does not limit the invention to stations which are mobile.

A wireless protocol may comprise a set of rules governing communications between the stations in the wireless communications system, and may be referred to as an air interface and may conform to a standard. The first wireless protocol may be a first air interface and the second wireless protocol may be a second air interface. The first and second wireless protocols may conform respectively to first and second (sets of) standards, e.g. new and legacy standards. In one arrangement, the first wireless protocol conforms to the 16m (new) standard, and the second wireless protocol conforms to the 16e/16j (legacy) standards. A station which is operable to communicate using a new standard may also be operable to communicate using a legacy standard, whereas another station may be operable to communicate using only the legacy standard.

The overall frame structure may comprise a number of synchronous frame structures including at least a base station frame structure, a first relay-station frame structure and a second relay-station frame structure, and optionally a subscriber station frame structure. Each of the frame structures may be divided in the same manner into the access and relay periods defined above, such that the access and relay periods across frame structures are synchronous. More particularly, each frame structure in the overall frame structure may comprise a downlink subframe and an uplink subframe, with each subframe including a first-protocol access period, a first-protocol relay period, a second-protocol access period and a second-protocol relay period. An access period may precede a relay period in a frame structure or vice versa.

Access communications may comprise wireless communications for the purpose of a subscriber station accessing network resources. Such communications may be between the subscriber station and one or both of the base station and a relay station, with the subscriber station transmitting or receiving data.

Relay communications may comprise wireless communications for the purpose of relaying data, for example between the base station and a relay station. Primarily, relay communications may take place between a relay station and the base station, with the relay station transmitting to the base station data which it previously received from a subscriber station, or receiving from the base station data for subsequent transmission to a subscriber station. However, relay communications may also comprise communications between the relay station and a subscriber station, with the relay station transmitting data to or receiving data from a subscriber station. In particular, such relay communications between a relay station and a subscriber station may take place according to the 16m standard.

More particularly, each frame structure of the overall frame structure may comprise a downlink subframe in which:—
  during the first-protocol access period, the base station and/or the first relay station is to transmit to a said subscriber station using the first wireless protocol, with the first relay station in the transmit mode;
  during the first-protocol relay period, the base station is to transmit to the first relay station using the first wireless protocol, with the first relay station in the receive mode;
  during the second-protocol access period, the base station and/or the second relay station is to transmit to a said subscriber station using the second wireless protocol, with the second relay station in the transmit mode; and
  during the second-protocol relay period, the base station is to transmit to the second relay station using the second wireless protocol, with the second relay station in the receive mode.

Furthermore, each frame structure of the overall frame structure may further comprise an uplink subframe in which:—
  during the first-protocol access period, a said subscriber station is to transmit to the base station and/or the first relay station using the first wireless protocol, with the first relay station in the receive mode;
  during the first-protocol relay period, the first relay station is to transmit to the base station using the first wireless protocol, with the first relay station in the transmit mode;
  during the second-protocol access period, a said subscriber station is to transmit to the base station and/or the second relay station using the second wireless protocol, with the second relay station in the receive mode; and
  during the second-protocol relay period, the second relay station is to transmit to the base station using the second wireless protocol, with the second relay station in the transmit mode.

The first relay station may also be operable to communicate with one or more of the said subscriber stations using the second wireless protocol, for example during one or both of the downlink and uplink second-protocol access periods.

Moreover, the first relay station may communicate with a subscriber station (using e.g. the first wireless protocol), in addition to or in place of the base station, during one or both of the downlink and uplink first-protocol relay periods.

The overall frame structure may be arranged such that the access periods are contiguous and the relay periods are contiguous. It may also be the case that the overall frame structure is arranged such that the first-protocol periods and the second-protocol periods are alternate.

During an idle period, it may be the case that a relay station does not engage in any wireless communications, including data communications and control communications. The relay station may perform processing operations during an idle period. The idle mode may be used to avoid interference between the first relay station (e.g. a 16m RS) and the second relay station (e.g. a 16j RS). For example, if, during an idle period, the first relay station is used to transmit traffic to a MS, the signal from the first relay station in transmitting mode may cause severe interference in the second relay station in receiving mode.

Switching between one mode and another mode may comprise switching from the one mode to the other mode or vice versa. Switching from the transmit mode to the receive mode may comprise the relay station transmitter carrier ramping down, the Tx/Rx antenna switch actuating, and the relay station receiver section activating. The time taken for this to happen may be referred to as a relay transmit-to-receive transition time gap (R-TTG). Switching from the receive mode to the transmit mode may comprise the relay station transmitter carrier ramping up, the Rx/Tx antenna switch actuating, and the relay station transmitter section activating. The time taken for this happen may be referred to as a relay receive-to-transmit transition time gap (R-RTG). During switching, the relay station may not be transmitting or receiving modulated data. By an idle period "accommodating" switching, it is meant that a substantial part of the switching procedure (or of the R-TTG or R-RTG) takes place during the idle period.

The method may comprise operating the first relay station to switch between the one of the transmit mode and the receive mode and the other of the transmit mode and the receive mode during the idle period for the first relay station.

In the method, during the second-protocol access period, the second relay station may be in one of a transmit mode and a receive mode and, during the second-protocol relay period, the second relay station may be in the other of the transmit mode and the receive mode. The subframe may further comprise an idle period for the second relay station for substantially the whole of one or both of the first-protocol access period and the first-protocol relay period, to avoid communications using the second wireless protocol interfering with communications using the first wireless protocol; and the overall frame structure may be further arranged to position the idle period for the second relay station between the second-protocol access period and the second-protocol relay period, to accommodate switching of the second relay station between the one of the transmit mode and the receive mode and the other of the transmit mode and the receive mode.

The method may comprise operating the second relay station to switch between the one of the transmit mode and the receive mode and the other of the transmit mode and the receive mode during the idle period for the second relay station.

The system may be operated in accordance with the overall frame structure in which, in one or both of the downlink subframe and the uplink subframe, a said idle period arises between a period in which the relay station is in the transmit mode and a period in which the relay station is in the receive mode.

The method may comprise operating a said relay station to switch modes during an idle period which arises between an access period and a relay period of a said frame structure.

The switching takes place during a relay transmit-to-receive transition time gap (R-TTG) or a relay receive-to-transmit transition time gap (R-RTG). The overall frame structure is arranged so that idle periods in relay station frame structures accommodate the R-TTG and R-RTG (with an idle period appearing between a period in which a relay station is in a receive mode and a period in which it is in a transmit mode or between a period in which it is in a transmit mode and a period in which it is in a receive mode).

According to a second aspect, there is provided a method of operating a base station for use in a wireless communications system comprising at least the base station, a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the method comprising operating the base station according to an overall frame structure in which a subframe comprises:
  a first-protocol access period for access communications using the first wireless protocol, during which the first relay station is in one of a transmit mode and a receive mode;
  a first-protocol relay period for relay communications using the first wireless protocol, during which the first relay station is in the other of the transmit mode and the receive mode;
  a second-protocol access period for access communications using the second wireless protocol; and
  a second-protocol relay period for relay communications using the second wireless protocol;
the subframe further comprising an idle period for the first relay station for substantially the whole of one or both of the second-protocol access period and the second-protocol relay period, to avoid communications using the first wireless protocol interfering with communications using the second wireless protocol; and
wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

According to a third aspect, there is provided a method of operating a relay station for use in a wireless communications system comprising at least a base station, the relay station being a first relay station, a second relay station and one or more subscriber stations;
  wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the method comprising
  operating the first relay station according to an overall frame structure in which a subframe comprises:
    a first-protocol access period for access communications using the first wireless protocol, during which the first relay station is in one of a transmit mode and a receive mode;
    a first-protocol relay period for relay communications using the first wireless protocol, during which the first relay station is in the other of the transmit mode and the receive mode;
    a second-protocol access period for access communications using the second wireless protocol; and
    a second-protocol relay period for relay communications using the second wireless protocol;
  the subframe further comprising an idle period for the first relay station for substantially the whole of one or both of the second-protocol access period and the second-protocol relay period, to avoid communications using the first wireless protocol interfering with communications using the second wireless protocol; and
  wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

The method of the third aspect may comprise operating the first relay station to switch between the one of the transmit mode and the receive mode and the other of the transmit mode and the receive mode during the idle period for the first relay station.

In the method of the second and/or third aspect, the subframe may further comprise an idle period for the second relay station for substantially the whole of one or both of the first-protocol access period and the first-protocol relay period, to avoid communications using the second wireless protocol interfering with communications using the first wireless protocol; and wherein the overall frame structure is further arranged to position the idle period for the second relay station between the second-protocol access period and the second-protocol relay period, to accommodate switching of the second relay station between the one of the transmit mode and the receive mode and the other of the transmit mode and the receive mode.

According to a fourth aspect, there is provided apparatus for a base station for use in a wireless communications system comprising at least the base station, a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the apparatus comprising control circuitry configured to operate the base station according to an overall frame structure in which a subframe comprises:

a first-protocol access period for access communications using the first wireless protocol, during which the first relay station is in one of a transmit mode and a receive mode;

a first-protocol relay period for relay communications using the first wireless protocol, during which the first relay station is in the other of the transmit mode and the receive mode;

a second-protocol access period for access communications using the second wireless protocol; and a second-protocol relay period for relay communications using the second wireless protocol;

the subframe further comprising an idle period for the first relay station for substantially the whole of one or both of the second-protocol access period and the second-protocol relay period, to avoid communications using the first wireless protocol interfering with communications using the second wireless protocol; and wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

According to a fifth aspect, there is provided apparatus for a relay station for use in a wireless communications system comprising at least a base station, the relay station being a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the apparatus comprising control circuitry configured to operate the first relay station according to an overall frame structure in which a subframe comprises:

a first-protocol access period for access communications using the first wireless protocol, during which the first relay station is in one of a transmit mode and a receive mode;

a first-protocol relay period for relay communications using the first wireless protocol, during which the first relay station is in the other of the transmit mode and the receive mode;

a second-protocol access period for access communications using the second wireless protocol; and a second-protocol relay period for relay communications using the second wireless protocol;

the subframe further comprising an idle period for the first relay station for substantially the whole of one or both of the second-protocol access period and the second-protocol relay period, to avoid communications using the first wireless protocol interfering with communications using the second wireless protocol; and wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

In the apparatus of the fifth aspect, the control circuitry may be configured to operate the first relay station to switch between the one of the transmit mode and the receive mode and the other of the transmit mode and the receive mode during the idle period for the first relay station.

In the apparatus of the fourth or fifth aspect, the subframe may further comprise an idle period for the second relay station for substantially the whole of one or both of the first-protocol access period and the first-protocol relay period, to avoid communications using the second wireless protocol interfering with communications using the first wireless protocol; and wherein the overall frame structure is further arranged to position the idle period for the second relay station between the second-protocol access period and the second-protocol relay period, to accommodate switching of the second relay station between the one of the transmit mode and the receive mode and the other of the transmit mode and the receive mode.

According to a sixth aspect, there is provided an overall frame structure for use in a wireless communications system comprising at least a base station, a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol;

the overall frame structure having a subframe comprising:

a first-protocol access period for access communications using the first wireless protocol, during which the first relay station is in one of a transmit mode and a receive mode;

a first-protocol relay period for relay communications using the first wireless protocol, during which the first relay station is in the other of the transmit mode and the receive mode;

a second-protocol access period for access communications using the second wireless protocol; and a second-protocol relay period for relay communications using the second wireless protocol;

the subframe further comprising an idle period for the first relay station for substantially the whole of one or both of the second-protocol access period and the second-protocol relay period, to avoid communications using the first wireless protocol interfering with communications using the second wireless protocol; and wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

The subframe in the overall frame structure of the sixth aspect may further comprise an idle period for the second relay station for substantially the whole of one or both of the first-protocol access period and the first-protocol relay period, to avoid communications using the second wireless protocol interfering with communications using the first wireless protocol; and wherein the overall frame structure is further arranged to position the idle period for the second relay station between the second-protocol access period and the second-protocol relay period, to accommodate switching of the second relay station between the one of the transmit mode and the receive mode and the other of the transmit mode and the receive mode.

According to a seventh aspect, there is provided a method of operating a wireless communications system comprising at least a base station, a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the method comprising operating the system according to an overall frame structure in which a subframe comprises:
a first-protocol access period for access communications using the first wireless protocol, during which the first relay station is in one of a transmit mode and a receive mode;
a first-protocol relay period for relay communications using the first wireless protocol, during which the first relay station is in the other of the transmit mode and the receive mode;
a second-protocol access period for access communications using the second wireless protocol; and
a second-protocol relay period for relay communications using the second wireless protocol;
wherein the overall frame structure is arranged such that the first-protocol access period and the second-protocol access period for the base station are contiguous (in time).

In the method of the seventh aspect, the first-protocol and second-protocol relay periods for the base station may also be contiguous (in time).

It may also be the case that the overall frame structure is arranged such that, for the base station, the first-protocol periods and the second-protocol periods are alternate.

The method of the seventh aspect may include features of any of the other aspects.

The seventh aspect may also comprise methods of operating the base station and/or relay stations according to the defined overall frame structure, apparatuses for the base station and/or relay stations configured to operate the stations according to the overall frame structure, and the overall frame structure itself.

According to an eighth aspect, there is provided a computer program which, when run on a computer, causes the computer to perform the method of any of the first to third or seventh aspects, or to become the apparatus of the fourth, fifth or seventh aspect, the computer program optionally being carried by a carrier medium, wherein the carrier medium is preferably a recording medium or a transmission medium.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which:—

DETAILED DESCRIPTION

Embodiments of the invention relate to a frame structure for a multi-hop wireless communications system.

FIG. 2 shows a wireless communications system 10, which in this example is a WiMAX network, based on the IEEE 802.16 standards. The wireless communications system 10 comprises a base station 12, which in this example is a 16m base station, two relay stations 14 including a first relay station labelled 14A, which in this example is a new, 16m relay station, and a second relay station labelled 14B, which in this example is a legacy, 16j relay station, and several subscriber stations 18, including three legacy 16e subscriber stations labelled 18A, 18B and 18C, which in this example are mobile phones, and a new 16m subscriber station labelled 18D, which in this example is a personal digital assistant (PDA).

Figure 7:
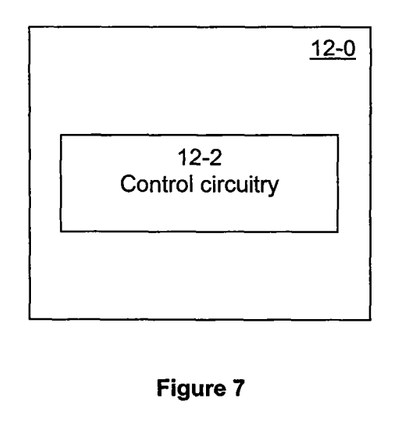
FIG. 7 is a block diagram representing a base station.
Figure 8:
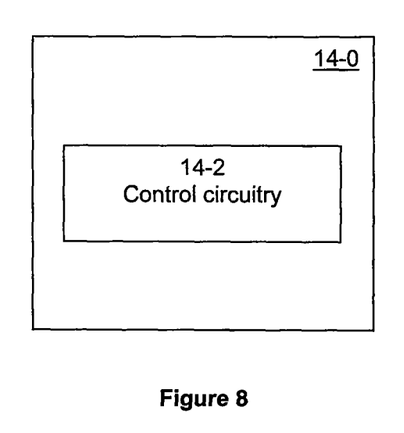
FIG. 8 is a block diagram representing a relay station.

FIGS. 7 and 8 show apparatus 12-0 for the base station 12 and apparatus 14-0 for the relay stations 14 in more detail. The apparatus 12-0 for the base station 12 includes control circuitry 12-2 configured to operate the base station 12 according to the methods and frame structures described below, while each apparatus 14-0 for the relay station 14 includes control circuitry 14-2 configured to operate the relay station 14 according to the methods and frame structures described below. Each of the apparatuses 12-0, 14-0 for the base station 12 and relay stations 14 respectively may also include communication circuitry (not shown) and other circuitry necessary for performing the functions of a base station or relay station respectively, which is not relevant to the description of the invention and so is omitted here. Each apparatus 12-0, 14-0 may comprise a module involving hardware elements, software elements or both.

The base station 12, the first relay station 14A and the subscriber stations 18A-D are operable to communicate with each other using a first wireless protocol, which in this example conforms to the new, 16m standard. Furthermore, the base station 12, the second relay station 14B and the subscriber station 18D are operable to communicate with each other using a second wireless protocol, which in this example conforms to the legacy, 16e/j standards. The first relay station 14A is also operable to communicate with the subscriber stations 18A-D using the second wireless protocol.

Figure 4:
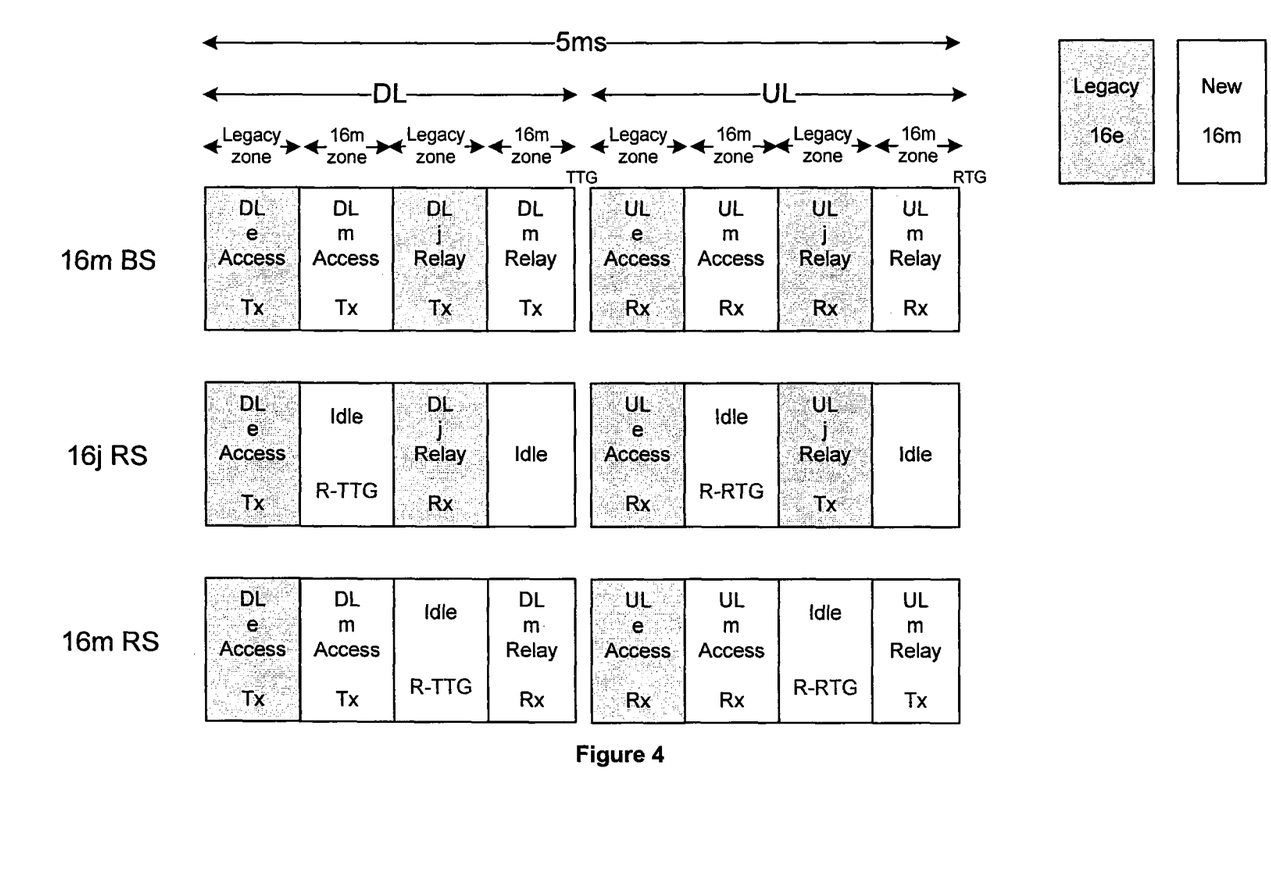
FIG. 4 illustrates a further overall frame structure suitable for the mixed deployment scenario of FIG. 2.

The wireless communications system 10, including each of its elements, is operated according to an overall frame structure, shown in FIG. 4.

The overall frame structure comprises a 16m BS frame structure for the base station 12, a 16m RS frame structure for the first relay station 14A and a 16j RS frame structure for the second relay station 14B. The frame structures are all of 5 ms duration and are synchronous with one another. Each frame structure is divided in the same manner into a downlink subframe DL and an uplink subframe UL, separated by a transition time gap TTG. Each of the downlink subframes DL and the uplink subframes UL is further divided in the same manner into a first-protocol access period DL m Access/UL m Access, a first-protocol relay period DL m Relay/UL m Relay, a second-protocol access period DL e Access/UL e Access and a second-protocol relay period DL j Relay/UL j Relay, such that the access and relay periods across frame structures are synchronous.

In the downlink subframe DL, during the first-protocol access period DL m Access, the base station 12 and/or the first relay station 14A is to transmit to the subscriber station 18D using the first wireless protocol, with the first relay station 14A in the transmit mode. During the first-protocol relay period DL m Relay, the base station 12 and/or the subscriber station 18D is to transmit to the first relay station 14A using the first wireless protocol, with the first relay station 14A in the receive mode. During the second-protocol access period DL e Access, the base station 12 and/or the first relay station 14A and/or the second relay station 14B is to transmit to a subscriber station 18A-D using the second wireless protocol, with the first and second relay stations 14A, 14B in the transmit mode. During the second-protocol relay period DL j Relay, the base station 12 is to transmit to the second relay station 14B using the second wireless protocol, with the second relay station 14B in the receive mode.

In the uplink subframe UL, during the first-protocol access period UL m Access, the subscriber station 18D is to transmit to the base station 12 and/or the first relay station 14A using the first wireless protocol, with the first relay station 14A in the receive mode. During the first-protocol relay period UL m Relay, the first relay station 14A is to transmit to the base station 12 and/or the subscriber station 18D using the first wireless protocol, with the first relay station 14A in the transmit mode. During the second-protocol access period UL e Access, a subscriber station 18A-D is to transmit to the base station 12 and/or the first relay station 14A and/or the second relay station 14B using the second wireless protocol, with the first and second relay stations 14A, 14B in the receive mode. During the second-protocol relay period UL j Relay, the second relay station 14B is to transmit to the base station 12 using the second wireless protocol, with the second relay station 14B in the transmit mode.

The overall frame structure, and in particular the 16m RS frame structure for the first relay station 14A, further comprises, in the downlink subframe DL, one idle period for substantially the whole of the second-protocol relay period DL j Relay. Furthermore, the 16m RS frame structure further comprises, in the uplink subframe UL, one idle period for substantially the whole of the second-protocol relay period UL j Relay. The idle periods in the 16m RS frame structure serve to avoid communications using the first wireless protocol from interfering with communications using the second wireless protocol.

The overall frame structure is arranged to position, in the downlink subframe DL in the 16m RS frame structure (for the first relay station 14A), the idle period during the second-protocol relay period DL j Relay between the first-protocol access period DL m Access and the first-protocol relay period DL m Relay. In this way, the idle period so positioned serves to accommodate switching of the first relay station 14A between the transmit mode and the receive mode, during the R-TTG. In addition, the overall frame structure is arranged to position, in the uplink subframe UL, the idle period during the second-protocol relay period UL j Relay between the first-protocol access period UL m Access and the first-protocol relay period UL m Relay. In this way, the idle period so positioned serves to accommodate switching of the first relay station 14A between the receive mode and the transmit mode, during the R-RTG. Put another way, the overall frame structure is arranged such that, in each of the downlink subframe DL and uplink subframe UL in the 16m BS frame structure for the base station 12, the access periods are contiguous and the relay periods are contiguous. It is also the case that the first-protocol periods and the second-protocol periods throughout the overall frame structure are alternate.

The overall frame structure, and in particular the 16j RS frame structure (for the second relay station 14B), further comprises, in the downlink subframe DL, an idle period for substantially the whole of the first-protocol access period DL m Access, and another idle period for substantially the whole of the first-protocol relay period DL m Relay, and, in the uplink subframe, an idle period for substantially the whole of the first-protocol access period UL m Access, and another idle period for substantially the whole of the first-protocol relay period UL m Relay. The idle periods in the 16j RS frame structure serve to avoid communications using the second wireless protocol from interfering with communications using the first wireless protocol.

The overall frame structure is further arranged to position, in the downlink subframe DL in the 16j RS frame structure (for the second relay station 14B), the idle period during the first-protocol access period DL m Access between the second-protocol access period DL e Access and the second-protocol relay period DL j Relay. In this way, the idle period so positioned serves to accommodate switching of the second relay station 14B between the transmit mode and the receive mode, during the R-TTG. In addition, the overall frame structure is arranged to position, in the uplink subframe UL in the 16j RS frame structure, the idle period during the first-protocol access period UL m Access between the second-protocol access period UL e Access and the second-protocol relay period UL j Relay. In this way, the idle period so positioned serves to accommodate switching of the second relay station 14B between the receive mode and the transmit mode, during the R-RTG.

Figure 5:
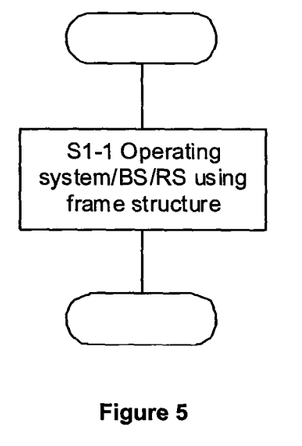
FIG. 5 is a flowchart representing a method of operating a wireless communications system/base station/relay station.

In use, the wireless communications system 10, in particular the base station 12 and the first and second relay stations 14A, 14B are operated according to the overall frame structure, as shown by the block S1-1 in the flowchart in FIG. 5.

Figure 6:
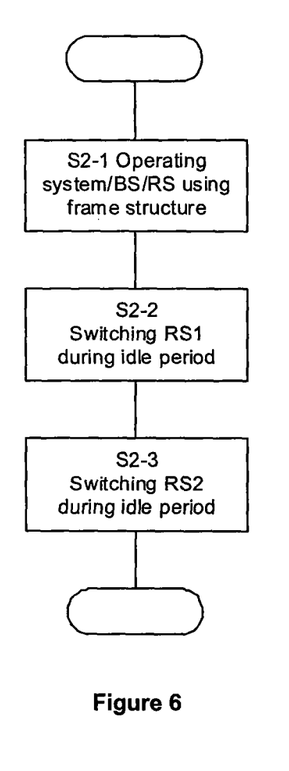
FIG. 6 is a flowchart representing another method of operating a wireless communications system/base station/relay station.

In another example, as shown in the flowchart in FIG. 6, the method includes, in addition to operating the wireless communications system 10 (including the base station 12 and the first and second relay stations 14A, 14B) using the overall frame structure (block S2-1), the switching operations of blocks S2-2 and S2-3. Block S2-2 represents switching the first relay station 14A between one of a transmit mode and a receive mode and the other of the transmit mode and the receive mode during the idle period positioned between the first-protocol access period DL m Access/UL m Access and the first-protocol relay period DL m Relay/UL m Relay in the 16m RS frame structure. Block S2-3 represents switching the second relay station 14B between one of a transmit mode and a receive mode and the other of the transmit mode and the receive mode during the idle period positioned between the second-protocol access period DL e Access/UL e Access and the second-protocol relay period DL j Relay/UL j Relay in the 16j RS frame structure.

The frame configuration of FIG. 3 introduces a problem that can lead to an unnecessarily reduced spectral efficiency due to the need for inserting gaps (at the expense of OFDMA data symbols) in order to accommodate R-TTG and R-RTG within the RS frame structures. In most cases, R-TTG and R-RTGs require more than one OFMDA symbol which results in a loss of more than two OFDMA symbols per 5 ms frame (downlink+uplink subframes). Over a period of 1000 frames (10 MHz, 16-QAM2/3, PUSC), the potential cell throughput is reduced by ~864 kbps.

This invention proposes a novel frame structure that does not require gaps to be inserted into the RS frames for accommodating R-TTGs and R-RTGs. Moreover, the proposed frame structure does not compromise legacy support in any way. From the 16m BS point of view, the access zones for the legacy and 16m systems are contiguous in time, which also results in the relay zones being contiguous (this applies for both downlink and uplink). From the RS perspective, this configuration allows for the idle periods (shown in FIG. 3) to be used to accommodate R-TTG and R-RTG. The result of this is a frame structure that can increase the overall spectral efficiency of a mixed deployment similar to that shown in FIG. 2.

As previously mentioned, the 16m BS (MR-BS) and 16m RS frame structures allow for full legacy support. Unlike the structure shown in FIG. 3, the proposed frame structure provides full legacy support without causing degradation of spectral efficiency.

FIG. 4 demonstrates the proposed frame structure where the access zones for both legacy and 16m systems are contiguous in time. The relay zones are also contiguous and this configuration applies to both downlink and uplink.

It is clear from FIG. 4 that OFDMA symbols are not sacrificed to accommodate R-TTG and R-RTG. The idle periods present within the RS frames can simply be used for the transmit and receive transition gaps, thus causing no degradation of spectral efficiency (unlike the general frame structure shown in FIG. 3).

This invention proposes novel BS and RS frame structure designs that can be used to fully support legacy MSs and RSs when they exist as part of a mixed deployment alongside new 802.16m terminals and RSs. The general concept is to have the access zones for both legacy and 16m systems being contiguous in time. The relay zones will also be contiguous and this configuration applies to both downlink and uplink. Considering the required R-TTGs and R-RTGs within the RSs frame structures, the proposed configuration of the BS and RS frame allows the 16j and 16m RSs to accommodate these transition gaps within the idle periods, thus mitigating the need to insert gaps within the RS frames (at the expense of OFDMA data symbols), and more importantly, preventing the unnecessary degradation of spectral efficiency.

In summary the benefits of this proposal may be;

A BS frame structure for supporting two types of RSs within the same cell;

Full legacy support for pre-existing network entities;

Improved spectral efficiency as data symbols are not sacrificed to accommodate transition gaps;

Transparent operation to a legacy TDD terminal.

It should be understood that the invention is not limited to the arrangement described above, and that another arrangement of a base station, relay stations and subscriber stations may fall within the scope of the claims.

It will be appreciated that the aforementioned circuitry may have other functions in addition to the mentioned functions, and that these functions may be performed by the same circuit.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of operating a wireless communications system comprising at least a base station, a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the method comprising operating the system according to an overall frame structure in which a subframe comprises:

a first-protocol access period for access communications using the first wireless protocol, during which the first relay station and the base station are in one of a transmit mode and a receive mode;

a first-protocol relay period for relay communications using the first wireless protocol, during which the base station is in one of the transmit mode and the receive mode and the first relay station is in the other of the transmit mode and the receive mode;

a second-protocol access period for access communications using the second wireless protocol, during which the second relay station and the base station are in one of a transmit mode and a receive mode; and a second-protocol relay period for relay communications using the second wireless protocol, during which the base station is in one of the transmit mode and the receive mode and the second relay station is in the other of the transmit mode and the receive mode;

the subframe further comprising an idle period for the first relay station for substantially the whole of one or both of the second-protocol access period and the second-protocol relay period, to avoid communications using the first wireless protocol interfering with communications using the second wireless protocol; and wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

2. The method of claim 1 comprising operating the first relay station to switch between the one of the transmit mode and the receive mode and the other of the transmit mode and the receive mode during the idle period for the first relay station.

3. The method of claim 1 or 2 wherein the subframe further comprises an idle period for the second relay station for substantially the whole of one or both of the first-protocol access period and the first-protocol relay period, to avoid communications using the second wireless protocol interfering with communications using the first wireless protocol;

and wherein the overall frame structure is further arranged to position the idle period for the second relay station between the second-protocol access period and the second-protocol relay period, to accommodate switching of the second relay station between the one of the transmit mode and the receive mode and the other of the transmit mode and the receive mode.

4. The method of claim 3 comprising operating the second relay station to switch between the one of the transmit mode and the receive mode and the other of the transmit mode and the receive mode during the idle period for the second relay station.

5. A method of operating a base station for use in a wireless communications system comprising at least the base station, a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the method comprising operating the base station according to an overall frame structure in which a sub frame comprises:

a first-protocol access period for access communications using the first wireless protocol, during which the first relay station and the base station are in one of a transmit mode and a receive mode;

a first-protocol relay period for relay communications using the first wireless protocol, during which the base station is in one of the transmit mode and the receive mode and the first relay station is in the other of the transmit mode and the receive mode;

a second-protocol access period for access communications using the second wireless protocol, during which the second relay station and the base station are in one of a transmit mode and a receive mode; and a second-protocol relay period for relay communications using the second wireless protocol, during which the base station is in one of the transmit mode and the receive mode and the second relay station is in the other of the transmit mode and the receive mode;

the subframe further comprising an idle period for the first relay station for substantially the whole of one or both of the second-protocol access period and the second-protocol relay period, to avoid communications using the first wireless protocol interfering with communications using the second wireless protocol; and wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

6. A method of operating a relay station for use in a wireless communications system comprising at least a base station, the relay station being a first relay station, a second relay station and one or more subscriber stations;

wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the method comprising operating the first relay station according to an overall frame structure in which a sub frame comprises:

a first-protocol access period for access communications using the first wireless protocol, during which the first relay station and the base station are in one of a transmit mode and a receive mode;

a first-protocol relay period during for relay communications using the first wireless protocol, during which the base station is in one of the transmit mode and the receive mode and the first relay station is in the other of the transmit mode and the receive mode;

a second-protocol access period for access communications using the second wireless protocol, during which the second relay station and the base station are in one of a transmit mode and a receive mode; and a second-protocol relay period for relay communications using the second wireless protocol, during which the base station is in one of the transmit mode and the receive mode and the second relay station is in the other of the transmit mode and the receive mode;

the subframe further comprising an idle period for the first relay station for substantially the whole of one or both of the second-protocol access period and the second-protocol relay period, to avoid communications using the first wireless protocol interfering with communications using the second wireless protocol; and wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

7. The method of claim 6 comprising operating the first relay station to switch between the one of the transmit mode and the receive mode and the other of the transmit mode and the receive mode during the idle period for the first relay station.

8. The method of claim 5, 6, or 7 wherein
the subframe further comprises an idle period for the second relay station for substantially the whole of one or both of the first-protocol access period and the first-protocol relay period, to avoid communications using the second wireless protocol interfering with communications using the first wireless protocol;
and wherein the overall frame structure is further arranged to position the idle period for the second relay station between the second-protocol access period and the second-protocol relay period, to accommodate switching of the second relay station between the one of the transmit mode and the receive mode and the other of the transmit mode and the receive mode.

9. Apparatus for a base station for use in a wireless communications system comprising at least the base station, a first relay station, a second relay station and one or more subscriber stations;
wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the apparatus comprising
control circuitry configured to operate the base station according to an overall frame structure in which a subframe comprises:
a first-protocol access period for access communications using the first wireless protocol, during which the first relay station and the base station are in one of a transmit mode and a receive mode;
a first-protocol relay period for relay communications using the first wireless protocol, during which the base station is in one of the transmit mode and the receive mode and the first relay station is in the other of the transmit mode and the receive mode;
a second-protocol access period for access communications using the second wireless protocol, during which the second relay station and the base station are in one of a transmit mode and a receive mode; and
a second-protocol relay period for relay communications using the second wireless protocol, during which the base station is in one of the transmit mode and the receive mode and the second relay station is in the other of the transmit mode and the receive mode;
the subframe further comprising an idle period for the first relay station for substantially the whole of one or both of the second-protocol access period and the second-protocol relay period, to avoid communications using the first wireless protocol interfering with communications using the second wireless protocol; and
wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

10. Apparatus for a relay station for use in a wireless communications system comprising at least a base station, the relay station being a first relay station, a second relay station and one or more subscriber stations;
wherein the base station, the first relay station and one or more of the said subscriber stations are operable to communicate with each other using at least a first wireless protocol, and wherein the base station, the second relay station and one or more of the said subscriber stations are operable to communicate with each other using at least a second wireless protocol; the apparatus comprising
control circuitry configured to operate the first relay station according to an overall frame structure in which a subframe comprises:
a first-protocol access period for access communications using the first wireless protocol, during which the first relay station and the base station are in one of a transmit mode and a receive mode;
a first-protocol relay period for relay communications using the first wireless protocol, during which the base station is in one of the transmit mode and the receive mode and the first relay station is in the other of the transmit mode and the receive mode;
a second-protocol access period for access communications using the second wireless protocol, during which the second relay station and the base station are in one of a transmit mode and a receive mode; and
a second-protocol relay period for relay communications using the second wireless protocol, during which the base station is in one of the transmit mode and the receive mode and the second relay station is in the other of the transmit mode and the receive mode;
the subframe further comprising an idle period for the first relay station for substantially the whole of one or both of the second-protocol access period and the second-protocol relay period, to avoid communications using the first wireless protocol interfering with communications using the second wireless protocol; and
wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

11. The apparatus of claim 10 wherein the control circuitry is configured to operate the first relay station to switch between the one of the transmit mode and the receive mode and the other of the transmit mode and the receive mode during the idle period for the first relay station.

12. The apparatus of claim 9, 10, or 11 wherein
the subframe further comprises an idle period for the second relay station for substantially the whole of one or both of the first-protocol access period and the first-protocol relay period, to avoid communications using the second wireless protocol interfering with communications using the first wireless protocol;
and wherein the overall frame structure is further arranged to position the idle period for the second relay station between the second-protocol access period and the second-protocol relay period, to accommodate switching of the second relay station between the one of the transmit mode and the receive mode and the other of the transmit mode and the receive mode.

13. A wireless communications system comprising at least:
a base station;
a first relay station;
a second relay station; and
one or more subscriber stations;
wherein the base station, the first relay station, the second relay station, and the one or more subscriber stations communicate using an overall frame structure comprising a first wireless protocol and a second wireless protocol;

wherein the base station, the first relay station and one or more of the said subscriber stations are operable to communicate with each other using at least the first wireless protocol, and wherein the base station, the second relay station and one or more of the said subscriber stations are operable to communicate with each other using at least the second wireless protocol;

the overall frame structure having a subframe comprising:

a first-protocol access period for access communications using the first wireless protocol, during which the first relay station and the base station are in one of a transmit mode and a receive mode;

a first-protocol relay period for relay communications using the first wireless protocol, during which the base station is in one of the transmit mode and the receive mode and the first relay station is in the other of the transmit mode and the receive mode;

a second-protocol access period for access communications using the second wireless protocol, during which the second relay station and the base station are in one of a transmit mode and a receive mode; and a second-protocol relay period for relay communications using the second wireless protocol, during which the base station is in one of the transmit mode and the receive mode and the second relay station is in the other of the transmit mode and the receive mode;

the subframe further comprising an idle period for the first relay station for substantially the whole of one or both of the second-protocol access period and the second-protocol relay period, to avoid communications using the first wireless protocol interfering with communications using the second wireless protocol; and wherein the overall frame structure is arranged to position the idle period for the first relay station between the first-protocol access period and the first-protocol relay period, to accommodate switching of the first relay station between the one of the transmit mode and the receive mode and the other of the transmit mode and the receive mode.

14. The wireless communications system of claim 13 wherein the subframe further comprising an idle period for the second relay station for substantially the whole of one or both of the first-protocol access period and the first-protocol relay period, to avoid communications using the second wireless protocol interfering with communications using the first wireless protocol;

and wherein the overall frame structure is further arranged to position the idle period for the second relay station between the second-protocol access period and the second-protocol relay period, to accommodate switching of the second relay station between the one of the transmit mode and the receive mode and the other of the transmit mode and the receive mode.

15. A non-transitory computer readable medium storing a computer program which, when run on a computer, causes the computer to perform the method as claimed in claim 1.

16. A non-transitory computer readable medium storing a computer program which, when run on a computer, causes the computer to become the apparatus as claimed in claim 9.

* * * * *